US005801517A

United States Patent [19]
Borle

[11] Patent Number: 5,801,517
[45] Date of Patent: Sep. 1, 1998

[54] METHOD AND CONTROL CIRCUIT FOR A SWITCHING REGULATOR

[76] Inventor: Lawrence Joseph Borle, 2/32 Eden Street, Innaloo, Australia

[21] Appl. No.: 717,432

[22] Filed: Sep. 20, 1996

[30] Foreign Application Priority Data

Sep. 22, 1995 [AU] Australia ................................ PN5582

[51] Int. Cl.$^6$ .............................. G05F 1/70; H02M 5/45; H02M 1/12; H02M 5/42
[52] U.S. Cl. ............................ 323/207; 363/37; 363/41; 363/89
[58] Field of Search ............................ 323/207; 363/37, 363/41, 89

[56] References Cited

U.S. PATENT DOCUMENTS

| | | | |
|---|---|---|---|
| 5,001,620 | 3/1991 | Smith | 363/89 |
| 5,045,991 | 9/1991 | Dhyanchand et al. | 323/207 |
| 5,463,299 | 10/1995 | Futami et al. | 318/618 |
| 5,614,810 | 3/1997 | Nostwick et al. | 323/207 |

OTHER PUBLICATIONS

Borle, L.J., et al., "Current Controlled Grid Connected Inverter", *Solar '93, Proceedings of the Annual Conference of the Australian and New Zealand Solar Energy Society*, vol. 2, Dec. 1–5, 1993, Fremantle, Western Australia, 374–379, (Dec. 1993).

Borle, L.J., et al., "Ramptime Current Control", *Proceedings APEC '96, Eleventh Annual IEEE Applied Power Electronics Conference and Exposition*, vol. 2, Mar. 3–7, 1996, San Jose, California, 828–834, (Mar. 1996).

Borle, L.J., et al., "Simulation and Evaluation of Current Control Techniques for Three Phase AC–DC Power Converters", *Proceedings IMACS–TCI '93 International Association for Mathematics and Computers in Simulation Conference*, Jul. 7–9, 1993, Montreal, Canada, 415–420, (1993).

Borle, L.J., et al., "ZACE Current Controlled Power Flow for AC–DC Power Converters", *25th Annual IEEE Power Electronics Specialists Conference*, Jun. 20–25, 1994, Taipei, Taiwan, 539–545, (Jun. 1994).

Borle, L.J., et al., "Zero Average Current Error Controlled Power Flow for AC–DC Power Converters", *IEEE Transactions on Power Electronics*, 10, 725–732, (Nov. 1995).

Malesani, L., et al., "Improved Current Control Technique of VSI PWM Inverters with Constant Modulation Frequency and Extended Voltage Range", *IEEE Transactions on Industry Applications*, 27, 365–369, (Mar. 1991).

(List continued on next page.)

*Primary Examiner*—Peter S. Wong
*Assistant Examiner*—Bao Q. Vu
*Attorney, Agent, or Firm*—Schwegman, Lundberg, Woessner, & Kluth, P.A.

[57] ABSTRACT

A control circuit for a switching regulator having an inductor, comprising a first input for receiving a current measurement signal proportional to the magnitude and direction of current in the inductor, (or proportional to the difference in current in two inductors for an AC system having more than one phase); the current measurement signal being compared with a reference current representing the desired current in the inductor, the circuit having a processor to determine the timing of switching instances, and to control switching of said inductor between a positive voltage (charging configuration while the current is positive) and a negative voltage state (discharging configuration while the current is positive), where the processor determines the difference between said current measurement signal and said reference current signal to generate a current error signal representative of the difference or representative of the polarity of the difference, and the processor calculates timing of switching instances to achieve an average current error signal close to zero, based on timing of previous switching instances relative to zero crossing times of the current error signal during a previous excursion.

26 Claims, 13 Drawing Sheets

OTHER PUBLICATIONS

Redl, R., et al., "Frequency Stablization and Synchronization of Free-Running Current-Mode-Controlled Converters", *IEEE 1986 Power Electronics Specialists Conference*, 519–530, (1986).

Ruiz, J.M., et al., "Minimal UPS Structure with Sliding Mode Control and Adaptive Hysteresis Band", *IECON'90, 16th Annual Conference of IEEE Industrial Electronics Society*, Nov. 27–30, 1990, 1063–1067, (Nov. 1990).

Sepe, R.B., "A Unified Approach to Hysteretic and Ramp–Comparison Current Controllers", *Proc. IEEE Industry Applications Society Annual Meeting*, 724–731, (1993).

Tang, W., et al., "Small–Signal Modeling of Average Current–Mode Control", *IEEE Transactions on Power Electronics*, 8, 112–119, (Apr. 1993).

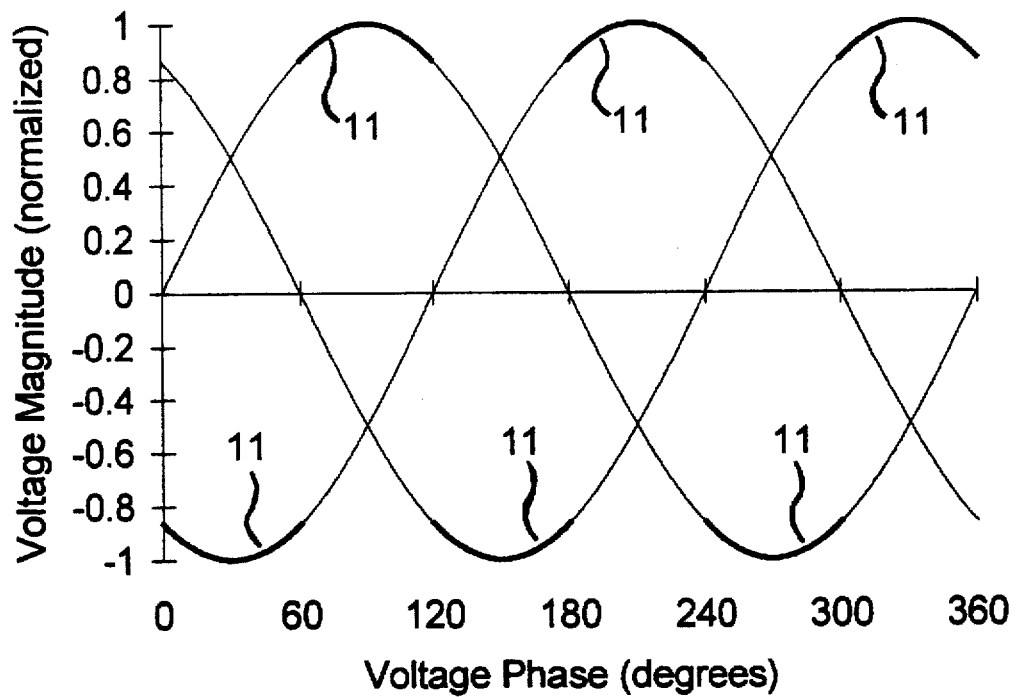
FIG 16       PRIOR ART
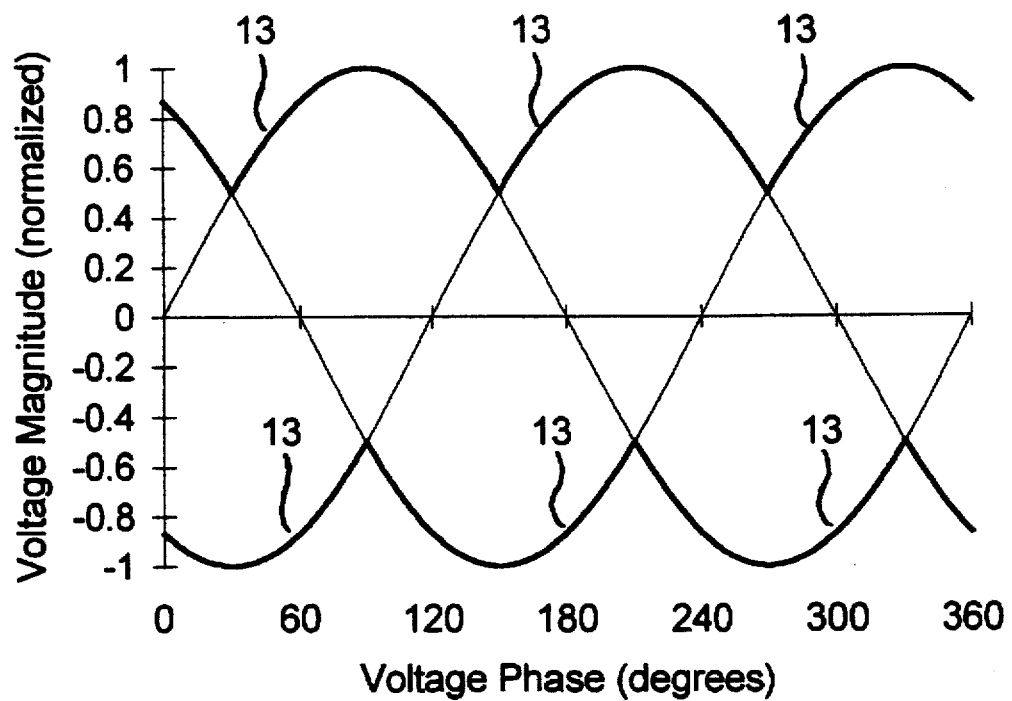
FIG 17       PRIOR ART

1

METHOD AND CONTROL CIRCUIT FOR A SWITCHING REGULATOR

FIELD OF THE INVENTION

This invention relates to switching regulators for use in switching power converters or power supplies, and particularly a technique for controlling the switching action in a switching regulator.

DESCRIPTION OF THE PRIOR ART

In current controlled power converters, power flow is controlled by forcing the current in an inductance (hereafter referred to as the inductor) to follow a reference current. This can be achieved by duty-cycle modulating the voltage across the inductor so that the average voltage results in the desired current flow. The prime purpose of a current control method is to force the current in the converter to match a specific desired value represented by a reference current. An ideal current control method would accurately follow the reference current with zero average current error (hereinafter ZACE) in each switching period. A current control with the ZACE characteristic will force the area of any one excursion (example: A−) to match the area of the previous excursion (A+), in the opposite direction. This will result in an average current error of zero for the period of the two excursions, which is one switching period ($\int i_e(t).dt=0$, about a predetermined reference current level).

The advantages of using a ZACE type current control method in an ac-dc PWM converter include:

- low order current harmonics in the inductor can be effectively eliminated, even in the presence of line voltage harmonics, or dc link voltage harmonics;
- the ac current can be controlled independently of DC link voltage variations, within the constraints of a minimum link voltage; and
- the transient response is the fastest possible for the given power circuit topology;
- power flow control is achieved by forcing the current to follow a generated current reference waveform, which can have real, reactive, and harmonic content, each of which are directly and independently controllable.

Of the many current control methods that have been proposed in the past, some have the ZACE characteristic. Perhaps the most well known is hysteresis current control, as described in United States patent specification U.S. Pat. No. 5,045,991, which entails controlling the current between two reference values, one higher than the actual desired value, and the other lower than the actual desired value. This basic method has the advantage of being simple and robust, but it has a widely varying switching frequency. In many power converter applications, a varying switching frequency may cause problems in the operation of certain loads. While an absolutely fixed switching frequency may not be necessary, in many applications, it is certainly desirable to restrict the switching frequency to a predictable and confined band.

Many methods of adapting hysteresis current control to a fixed switching frequency have been proposed. These methods vary the hysteresis band continuously so as to maintain a constant switching period. One way is to use the measured circuit voltages and the known inductance to continuously calculate a hysteresis band which should deliver a fixed switching frequency. This technique is described in "Frequency Stabilisation and Synchronisation of Free Running Current-Mode-Controlled Converters", authored by R Redl and N O Sokal, IEEE Power Electronics Specialists Conference, 1986, pp 519–530. This technique can be prone to error as the inductance value changes, and it lacks the robustness of a technique which relies solely on the current error signal, in view of difficulties with trying to predict or measure voltage levels and inductance values.

It has been considered that for a converter to be robust and simple, it would be preferable for a current control method to use the current error signal alone in the determination of switching instants. One such method, described in "Improved Current Control Technique of VSI PWM Inverters with Constant Modulation Frequency and Extended Voltage Range", authored by L Malesani et al, IEEE Transactions on Industry Applications, Vol 27 No. 2 pp 365–369, Mar./Apr. 1991, describes generating a varying hysteresis band using a phase-locked-loop. In some applications, it has been found that this method may not be completely successful in maintaining a fixed switching frequency.

Slope-generated hysteresis is another fixed switching frequency hysteresis method which uses the slopes of the error current waveform to calculate the appropriate hysteresis band. This was presented by the inventor and C. V. Nayar in a paper titled "ZACE Current Controlled Power Flow for AC-DC Power Converters", at the 1994 IEEE Power Electronics Specialists Conference proceedings pp 539–545. This method has the disadvantage that it differentiates the current error signal to derive the slopes (rates of change) used in the calculation of the required hysteresis band. This differentiation is susceptible to noise, so the output must be filtered. The result is that the effect of changes in the slope are delayed, and the switching frequency band is wider than might otherwise be achievable. Furthermore, the differentiation and calculations required take considerable circuitry to achieve.

Non-hysteresis type current control methods which are intended to achieve a ZACE type control with a fixed switching frequency have also been proposed. "Average Current Control" (ACC) is perhaps the best of such methods. ACC is described in a paper authored by W. Tang et al, titled "Small-Signal Modelling of Average Current-Mode Control", IEEE Trans Power Electronics, vol 8 no. 2 pp 112–119. However, a control method according to this technique must filter the error signal at a frequency well below the switching frequency so as to maintain stability. The result is a reduced bandwidth but there is also a slower transient response.

SUMMARY OF THE INVENTION

The present invention seeks to provide a ZACE type current control with optimal transient response (ie so that the transient response is limited only by the power circuit topology, and not by the current control technique) and a narrow switching frequency band, which uses only the current error signal in a relatively inexpensive circuit to determine appropriate switching instants.

In accordance with one aspect of the present invention there is provided a control circuit for a switching regulator having an inductor, said control circuit comprising:

- a first input for receiving a current measurement signal proportional to the magnitude and direction of current in said inductor, or proportional to the difference in current in any two said inductors;
- a reference current generating means for deriving a reference current signal representing the magnitude and direction of the desired current or current waveform in said inductor, or representing the difference in the desired current or current waveform in two said inductors;

a processing means for receiving said current measurement signal and said reference current signal, and determining the timing of switching instances; and an output to control switching of said inductor between a positive voltage (charging configuration while the current is positive) and a negative voltage state (discharging configuration while the current is positive) in response to said processing means;

wherein said processing means determines the difference between said current measurement signal and said reference current signal to generate a current error signal representative of the difference or representative of the polarity of the difference;

and wherein said processing means includes timing calculation means for calculating timing of switching instances to achieve an average current error signal close to zero, based on timing of previous switching instances relative to zero crossing times of the current error signal during a previous excursion.

Where the first input receives a current measurement signal proportional to the difference in current in two said inductors, a multiphase system is contemplated, where two of the phases are switched and the third phase is held as a standing phase. The standing phase is the phase whose voltage is opposite in polarity to both of the other phases, or generally opposite in polarity to both of the other phases and at least exceeding (either positively or negatively) the voltage of any of the other phases.

Preferably said timing calculation means determines a next switching instant time relative to zero-crossing of said current error signal, based on a previous time of a previous said switching instant relative to zero-crossing of said current error signal.

Preferably said timing calculation means determines a next switching instant time relative to zero-crossing of said current error signal, based on the time of a previous said switching instant, relative to the time between zero-crossing times of the current signal immediately before and after said previous said switching instant.

The determination of timing for a next said switching instant from any zero crossing of the current error signal, may be based on switching instant timing relative to any previous excursion of the current error signal, but preferably for most accurate control is based on the switching instant timing relative to the immediate previous excursion of the current error signal. Basing the switching instant timing relative to any excursion of the current error signal more than three switching periods of the current error signal previous to the instant under determination would be expected to produce a noticable lag in reaction of the control circuit to changing circuit parameters.

Further, the determination of timing for a next said switching instant from any zero crossing of the current error signal, may be based on switching instant timing relative to any previous current error signal excursion either above or below zero, regardless of whether the switching instant under determination occurs during a positive or negative going excursion of the current error signal.

In one configuration of the control circuit where the next switching instant timing is being based on previous switching instant timing during a current error signal excursion in a half switching period ending at the most recent current error signal zero crossing, or in a half period ending 1, 2, or 3 switching periods before the most recent current error signal zero crossing, said timing calculation means operates to switch a positive voltage across said inductor approximately when $$T_{bf} = \left(\frac{T_{af}}{T_a}\right)\left(\frac{T_{sw}}{2}\right),$$

and operates to switch a negative voltage across said inductor approximately when $$T_{ar} = \left(\frac{T_{br}}{T_b}\right)\left(\frac{T_{sw}}{2}\right);$$

where:

$T_{bf}$ is the calculated time when switching is to occur after the current error signal has crossed zero falling, $T_{af}$ is the measured time the current error signal was above zero after a said switching instant (above zero and falling), $T_a$ is the measured time the current error signal was above zero in a previous excursion, $T_{sw}/2$ is the desired time between successive current error signal zero crossings ($T_{sw}$ is the desired switching period), $T_{ar}$ is the calculated time when switching is to occur after the current error signal has crossed zero rising, $T_{br}$ is the measured time the current error signal was below zero after a said switching instant (below zero and rising), $T_b$ is the measured time the current error signal was below zero in a previous excursion.

In an alternative configuration of the control circuit where the next switching instant timing is based on previous switching instant timing during a current error signal excursion in a half period ending one, three, five, or seven current error signal zero crossings before the most recent current error signal zero crossing, said timing calculation means operates to switch a negative voltage across said inductor approximately when $$T_{ar} = \left(\frac{T_{arp}}{T_a}\right)\left(\frac{T_{sw}}{2}\right),$$

and operates to switch a positive voltage across said inductor approximately when $$T_{bf} = \left(\frac{T_{bfp}}{T_b}\right)\left(\frac{T_{sw}}{2}\right);$$

where:

$T_{ar}$ is the calculated time when switching is to occur after the current error signal has crossed zero rising, $T_{arp}$ is the measured time the current error signal was above zero before a said previous switching instant (above zero and rising), $T_a$ is the measured time the current error signal was above zero in a previous excursion, $T_{sw}/2$ is the desired time between successive current error signal zero crossings ($T_{sw}$ is the desired switching period), $T_{bf}$ is the calculated time when switching is to occur after the current error signal has crossed zero falling, $T_{bfp}$ is the measured time the current error signal was below zero before a said previous switching instant (below zero and falling), and $T_b$ is the measured time the current error signal was below zero in a previous excursion.

In either configuration it will be understood that the arrangements of the control circuit where the next switching instant timing is based on previous timings 1, 2, or 3 periods of the current error signal previous to the half period referred to above, are less preferred as increasing the delay between measurement and control is believed to increase the switching frequency band, and decrease the transient response.

Switching a positive voltage across the inductor causes a positive rate of change of current in the inductor, and conversely, switching a negative voltage across the inductor causes a negative rate of change of current in the inductor.

In a solely hardware based implementation, preferably said first input is connected to a first circuit for deriving said current measurement signal proportional to the magnitude and direction of the current in the inductor.

Preferably said output provides a binary signal which is to be used to control the switching of an active controlling device.

Preferably said active controlling device comprises a semiconductor switch or switches.

In accordance with a second aspect of the present invention there is provided a method of controlling a switching regulator having an inductor, comprising:

deriving a current measurement signal proportional to the magnitude and direction of current in said inductor, or proportional to the difference in current in two said inductors;

deriving a reference current signal representing the magnitude and direction of the desired current or current waveform in said inductor, or representing the difference in the desired current or current waveform in two said inductors;

determining the difference between said current measurement signal and said reference current signal to generate a current error signal representative of the difference; and calculating the timing of switching instances to control switching of said inductor to achieve an average current error signal close to zero, based on timing of previous switching instances relative to zero crossing of the current error signal during a previous excursion.

Preferably in the step of calculating said switching instances, a new time from zero-crossing of said current error signal to a said switching instant is calculated, based on a previous time of a previous said switching instant relative to zero-crossing of said current error signal.

Preferably in the step of calculating said switching instances, a new time from zero-crossing of said current error signal to a said switching instant is calculated, based on a previous time of a previous said switching instant relative to the time between zero-crossing times of the current error signal immediately before and after said previous said switching instant.

As discussed in relation to the control circuit, the determination of timing for a next said switching instant from any zero crossing of the current error signal, may be based on switching instant timing relative to any previous excursion of the current error signal, but preferably for most accurate control is based on the switching instant timing relative to the immediate previous excursion of the current error signal. Basing the switching instant timing relative to any excursion of the current error signal more than three periods of the current error signal previous to the instant under determination would be expected to produce a noticable lag in reaction of the control circuit to changing circuit parameters.

Further, the determination of timing for a next said switching instant from any zero crossing of the current error signal, may be based on switching instant timing relative to any previous current error signal excursion either above or below zero, regardless of whether the switching instant under determination occurs during a positive or negative going excursion of the current error signal.

Where a new switching instant is being determined based on previous switching instant timing during a current error signal excursion in a half period ending at the most recent current error signal zero crossing, or in a half period ending 1, 2, or 3 periods before the most recent current error signal zero crossing, in the step of calculating said switching instances, a positive voltage is switched to said inductor approximately when $$T_{bf} = \left(\frac{T_{af}}{T_a}\right)\left(\frac{T_{sw}}{2}\right),$$

and a negative voltage is switched to said inductor approximately when $$T_{ar} = \left(\frac{T_{br}}{T_b}\right)\left(\frac{T_{sw}}{2}\right);$$

where:

$T_{bf}$ is the calculated time when switching is to occur after the current error signal has crossed zero falling, $T_{af}$ is the measured time the current error signal was above zero after a said switching instant (above zero and falling), $T_a$ is the measured time the current error signal was above zero, $T_{sw}/2$ is the desired time between successive current error signal zero crossings ($T_{sw}$ is the desired switching period), $T_{ar}$ is the calculated time when switching is to occur after the current error signal, $T_{br}$ is the measured time the current error signal was below zero after a said switching instant (below zero and rising), $T_b$ is the measured time the current error signal was below zero.

In an alternative form of the method where the next switching instant timing is being based on previous switching instant timing during a current error signal excursion in a half period ending one, three, five, or seven zero crossings before the most recent current error signal zero crossing, in the step of calculating said switching instances, a negative voltage is switched across said inductor approximately when $$T_{ar} = \left(\frac{T_{arp}}{T_a}\right)\left(\frac{T_{sw}}{2}\right),$$

and a positive voltage is switched across said inductor approximately when $$T_{bf} = \left(\frac{T_{bfp}}{T_b}\right)\left(\frac{T_{sw}}{2}\right);$$

where:

$T_{ar}$ is the calculated time when switching is to occur after the current error signal has crossed zero rising, $T_{arp}$ is the measured time the current error signal was above zero before a said previous switching instant (above zero and rising), $T_a$ is the measured time the current error signal was above zero in a previous excursion, $T_{sw}/2$ is the desired time between successive current error signal zero crossings ($T_{sw}$ is the desired switching period), $T_{bf}$ is the calculated time when switching is to occur after the current error signal has crossed zero falling, $T_{bfp}$ is the measured time the current error signal was below zero before a said previous switching instant (below zero and falling), $T_b$ is the measured time the current error signal was below zero in a previous excursion.

In either configuration it will be understood that the arrangements of the control circuit where the next switching instant timing is based on previous timings 1, 2, or 3 periods of the current error signal previous to the half period referred to above, are less preferred as increasing the delay between measurement and control is believed to increase the switching frequency band.

Switching a positive voltage across the inductor causes a positive rate of change of current in the inductor, and conversely, switching a negative voltage across the inductor causes a negative rate of change of current in the inductor.

The invention will now be described in the following description of one specific embodiment thereof, in which.

Figure 11A:
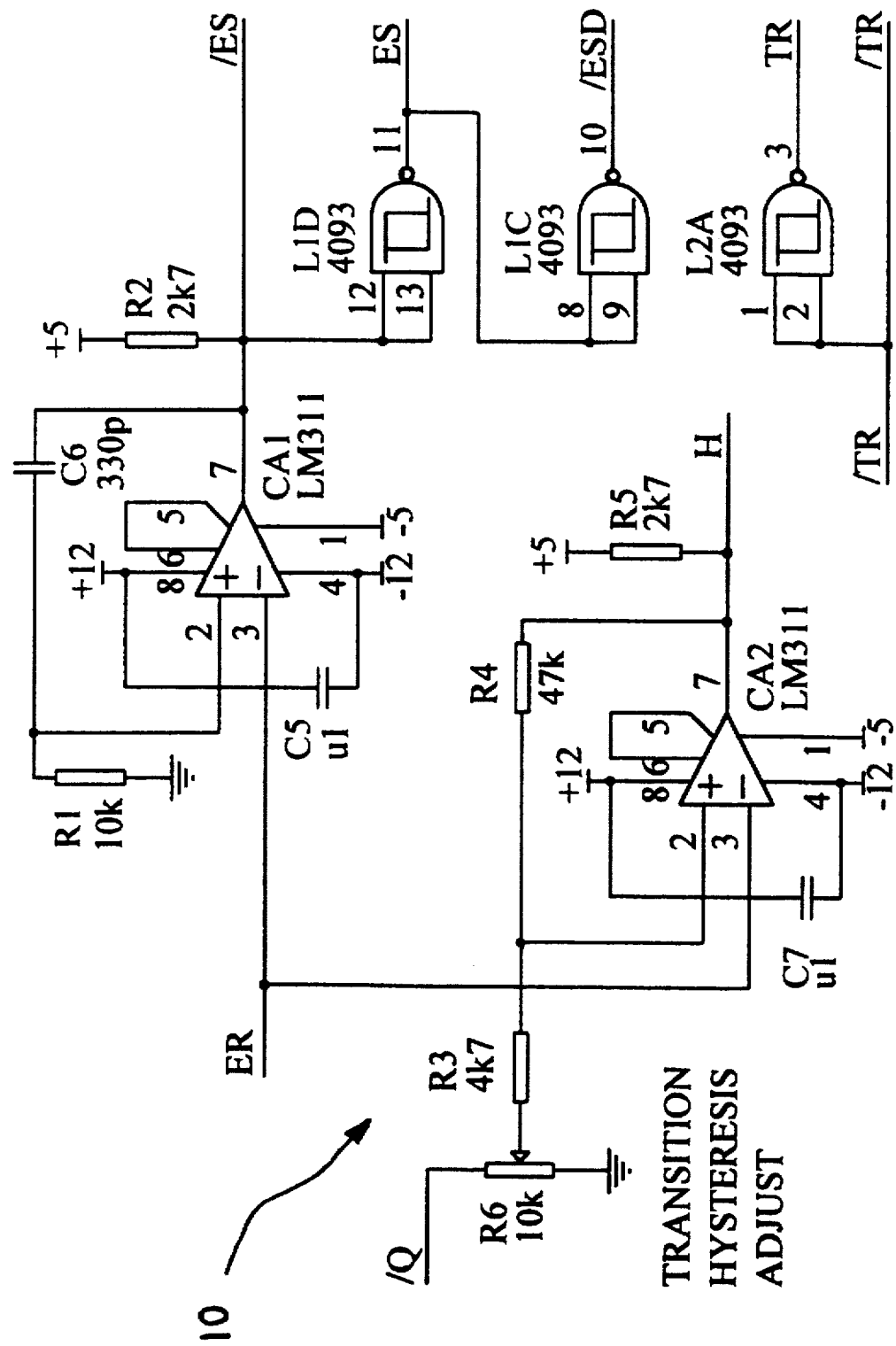
Figure 11B:
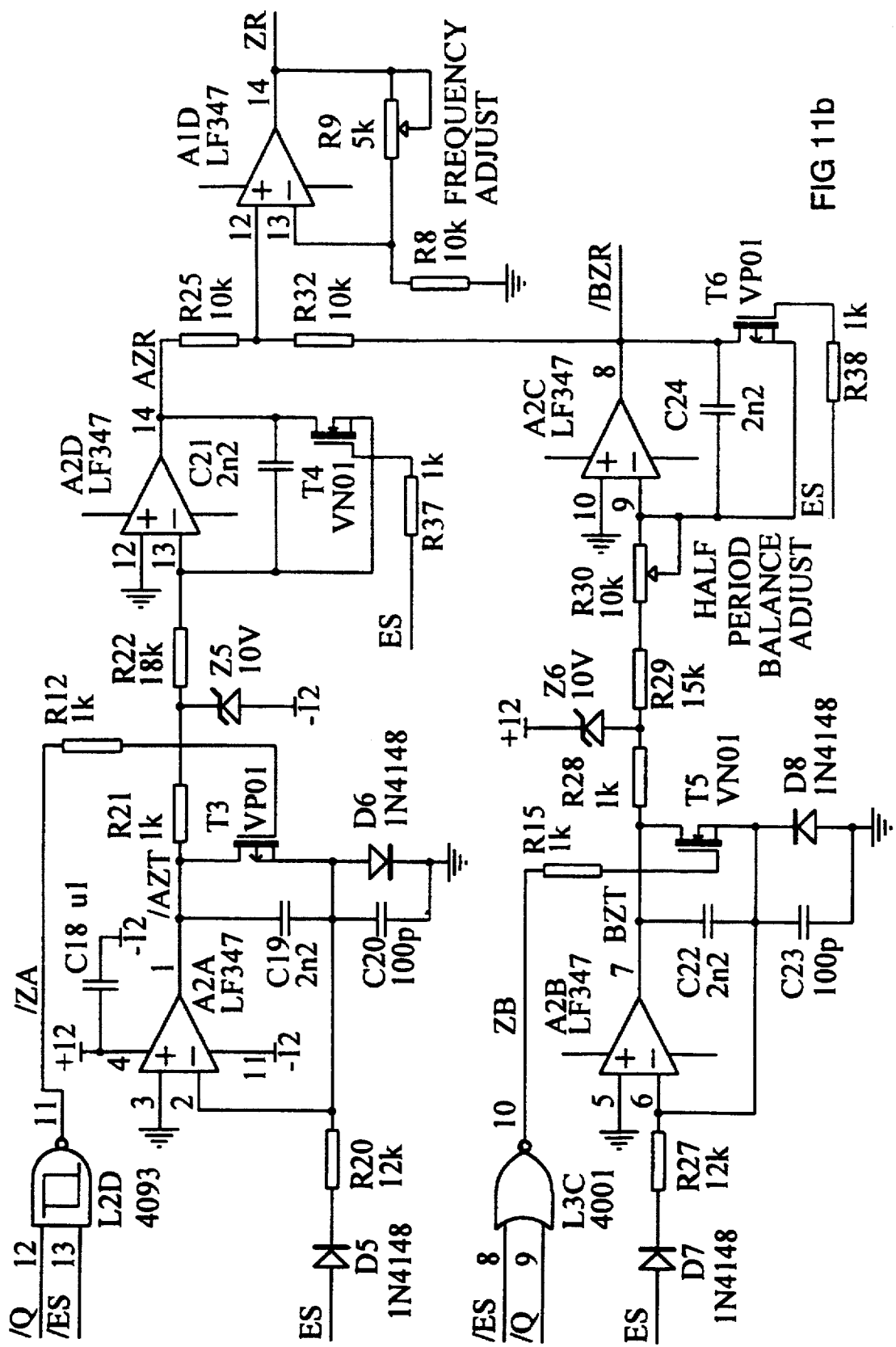
Figure 11C:
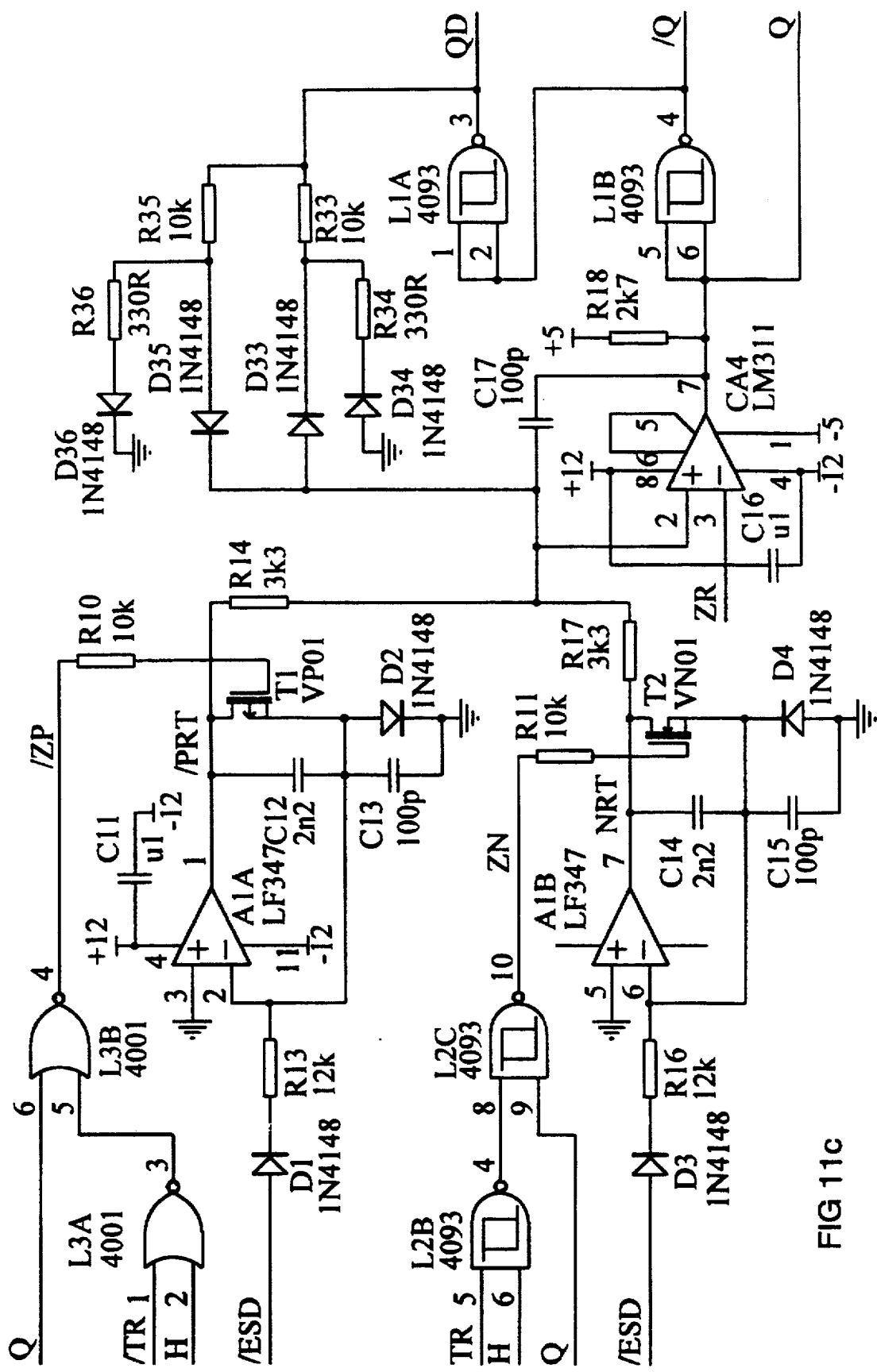
Figure 12:
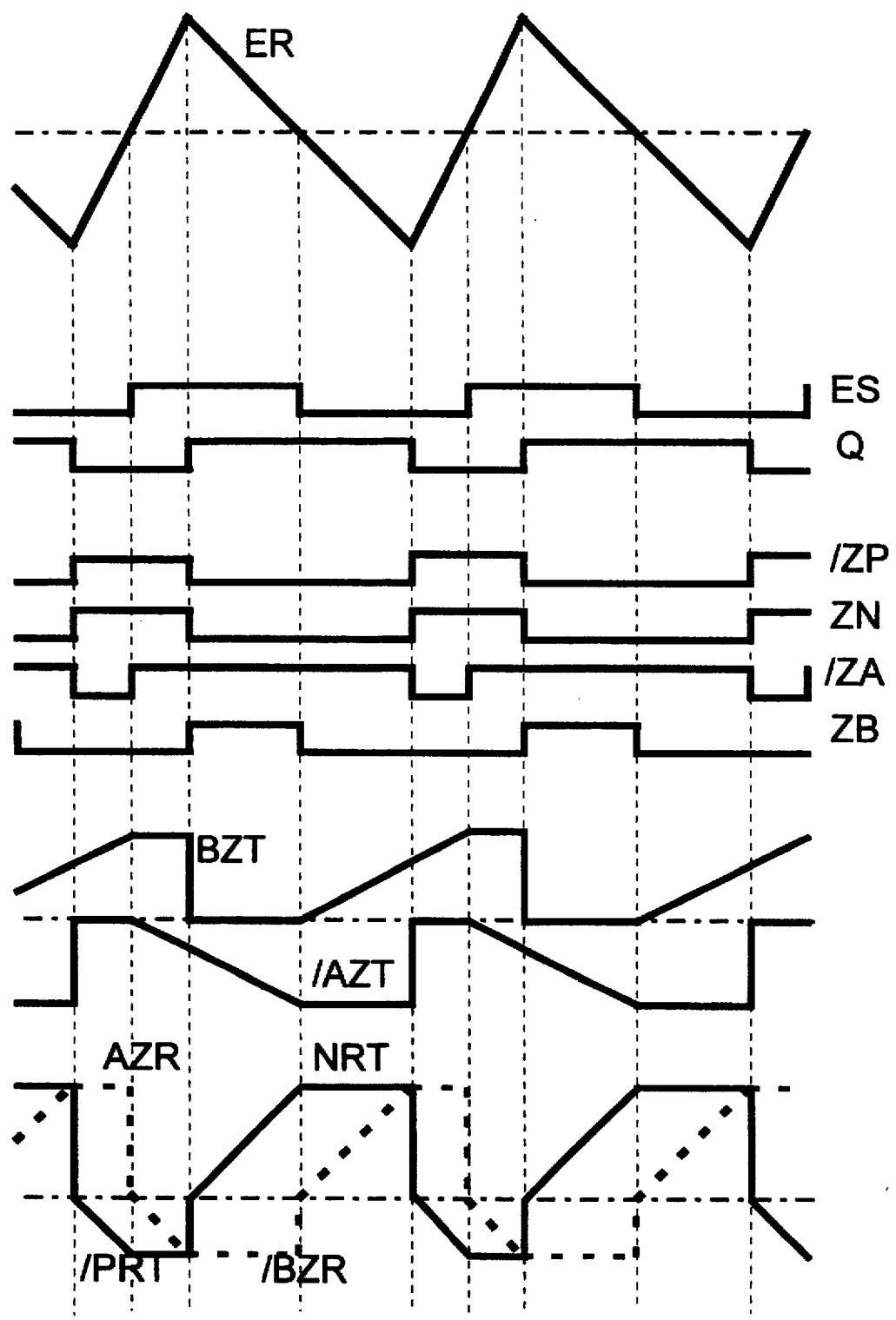
Figure 13:
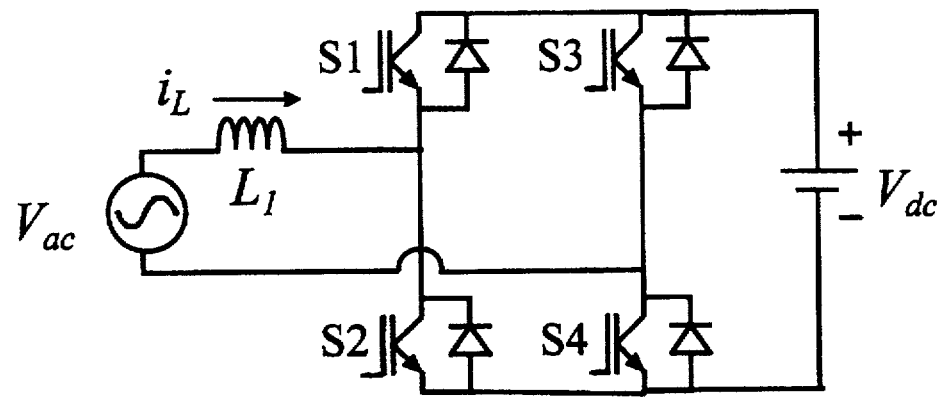
Figure 14:
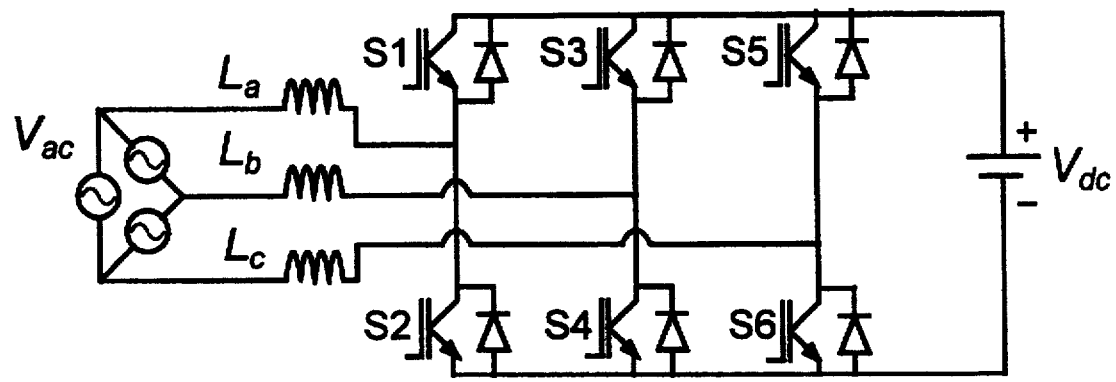
Figure 15:
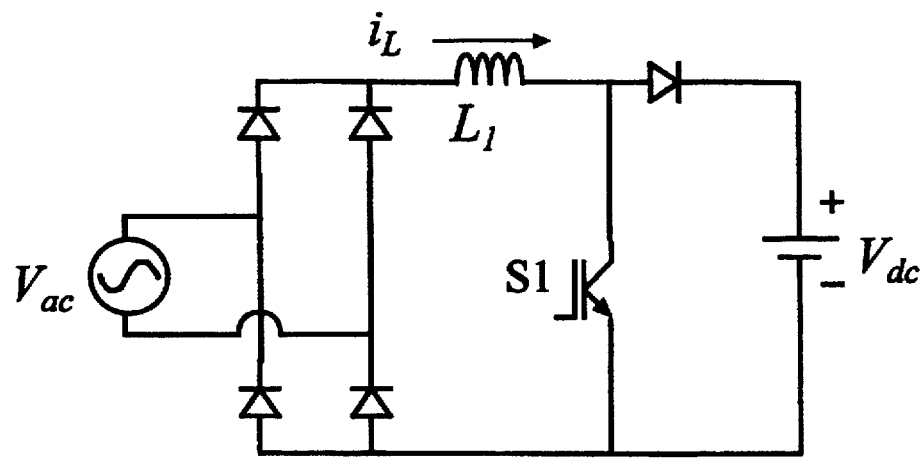

FIG. 11, divided into FIGS. 11a, 11b, and 11c, is a circuit schematic of a control circuit according to the embodiment;

FIG. 12 is a graph showing signal waveforms for the circuit of FIG. 11;

FIG. 13 is a circuit schematic of a single phase ac-dc converter;

FIG. 14 is a circuit schematic of a three phase ac-dc converter;

FIG. 15 is a circuit schematic of a single phase boost rectifier;

FIG. 16 is a graph showing standing phases in a three phase ac-dc converter, and FIG. 17 is a graph showing alternative standing phases in a three phase ac-dc converter.

Figure 3:
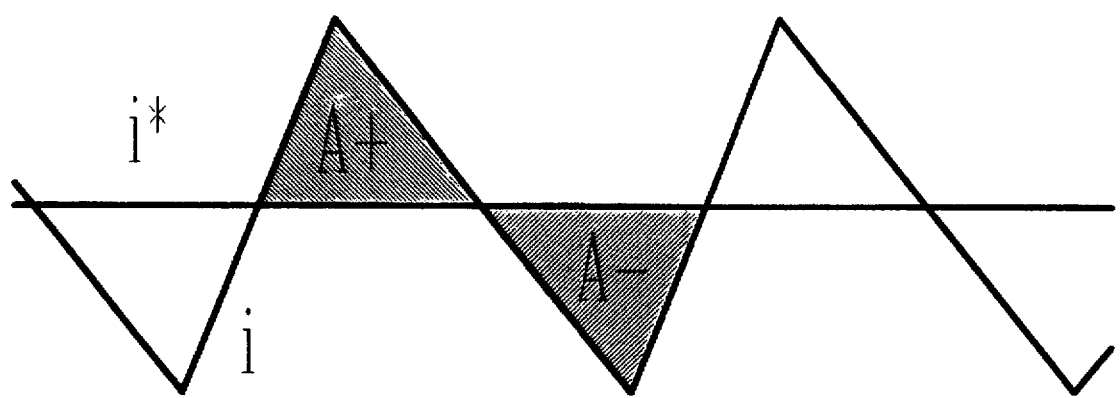
FIG. 3 is a graph showing the current error signal under ZACE control.

The current control method according to the invention, hereafter referred to as ramptime current control, is a new technique for directly controlling the inductor current in switched power converters. It is a method producing zero average current error (ZACE) in each switching period and a controlled narrow switching frequency band. Ramptime current control was developed in an effort to find a ZACE method with a fixed switching frequency. The ZACE concept is illustrated in FIG. 3. Referring to FIG. 3, a current control with the ZACE characteristic will force the area of any one excursion of the current error signal (example: A−) to match the area of the previous excursion (A+), in the opposite direction. This will result in an average current error of zero for the period of the two excursions, which is one switching period. This control method uses the current error signal alone to determine switching instants, and maintains a narrow switching frequency band. This method is explained by reference to the current error signal in FIG. 4.

Assuming the inductor has a fixed inductance, and there is negligible variance in both the power circuit voltages and the current reference signal within one switching period, the current error signal will have two distinct, constant slopes over that switching cycle. If $T_a$ is made equal to $T_b$, A+ will equal A−, and the average value of the current error signal over that switching period will be zero. Hence, to maintain ZACE and a fixed switching frequency, the desired value of each half switching period is:

$$T_a^* = T_b^* = \frac{T_{sw}}{2} \quad (1)$$

Figure 4:
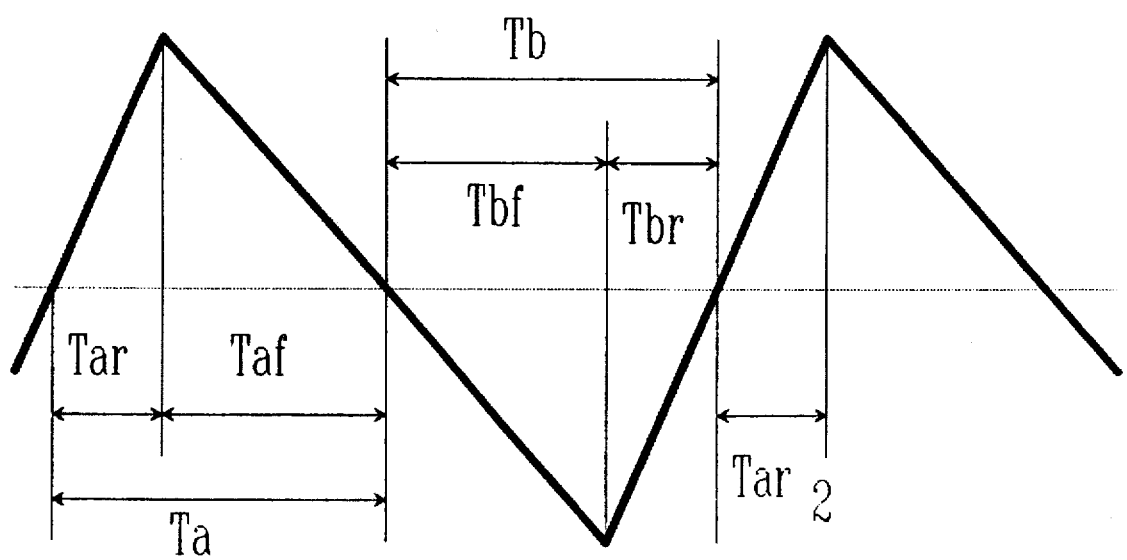
FIG. 4 is a graph showing the current error signal for the control circuit according to the embodiment.

The key to Ramptime current control is that all switching decisions are timed from a recent and preferably the most recent zero crossing of the current error signal. The controlled parameter is the current error signal ER. Each switching instant is chosen at the appropriate time after the last zero crossing of the current error signal so as to attempt to make the present excursion from zero last for exactly half the desired switching period. Referring to FIG. 4, $T_{ar}$ is chosen so that $T_a$ will equal $T_{sw}/2$, and $T_{bf}$ is chosen so that $T_b$ will equal $T_{sw}/2$. The method of determination is simple geometry. To determine the desired $T_{bf}^*$, $T_a$ and $T_{af}$ are each measured (indicated by ^) during the previous current error signal excursion, and used in the formula in (2). $T_{ar}^*$ is determined in the same manner:

$$T_{bf}^* = \left(\frac{\hat{T}_{af}}{\hat{T}_a}\right)\left(\frac{T_{sw}}{2}\right) \quad (2)$$

$$T_{ar}^* = \left(\frac{\hat{T}_{br}}{\hat{T}_b}\right)\left(\frac{T_{sw}}{2}\right) \quad (3)$$

DESCRIPTION OF THE PREFERRED EMBODIMENT

Figure 5:
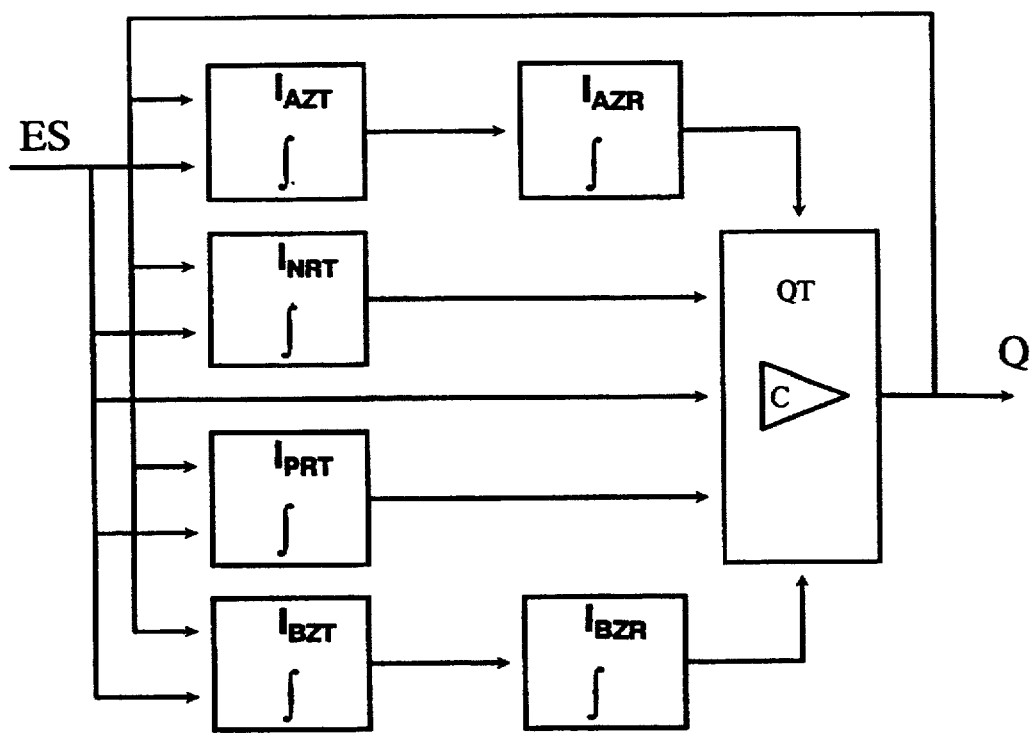
FIG. 5 is a functional block diagram of a current control circuit according to the embodiment.

The implementation of ramptime current control is illustrated in the functional block diagram of processing means in the form of the control circuit 1 shown in FIG. 5. The processing means receives input signal ES which is a binary signal indicating the polarity of the current error signal ER. The function of each of the blocks is as follows.

$I_{AZT}$ is an integrator to measure $T_a$, the duration of time when the current error signal ER is above zero.

$I_{NRT}$ is an integrator to measure $T_{af}$, the duration of time when the current error signal ER is above zero and ramping downwards.

$I_{AZR}$ is an integrator for timing out $T_{bf}$, the duration of time after the current error signal ER has crossed zero moving downwards. At the end of the determined time $T_{bf}$ the power circuit is switched so that the current will ramp upwards.

$I_{BZT}$ is an integrator to measure $T_b$, the duration of time when the current error signal is below zero.

$I_{PRT}$ is an integrator to measure $T_{br}$ the duration of time when the current error signal ER is below zero and ramping upwards.

$I_{BZR}$ is an integrator for timing out $T_{ar}$, the duration of time after the current error signal ER has crossed zero moving upwards. At the end of the determined time $T_{ar}$, the power circuit is switched so that the current will ramp downwards.

To implement ramptime current control, the power circuit is switched to supply a positive voltage across the inductor at the instant when equation 2 is satisfied, and is switched to supply a negative voltage across the inductor at the instant when equation 3 is satisfied.

L, in the form of a current measuring circuit 2 control circuit also comprises:

means for deriving a current measurement signal i proportional to the magnitude and direction of the current in the inductor;

means for generating a reference current signal i* representing the magnitude and direction of the desired current or current waveform in the inductor L, in the form of a reference current generator circuit 3;

means for generating a current error signal ER, in the form of a summing circuit 5, the current error signal ER being proportional to the difference between the current measurement signal and the reference current signal, where the maximum absolute value of the signal is limited to a certain value; and means to switch the power circuit between appropriate configurations based on the value of the output signal Q, in the form of a power switch drive circuit 7.

The control circuit 1 comprises:

means for measuring $T_a$, the duration of time when the current error signal ER is above zero (Functional block $I_{AZT}$);

means for measuring $T_{af}$ the duration of time when the current error signal ER is above zero and ramping downwards (Functional block $I_{NRT}$);

means for determining $T_{bf}$ the duration of time after the current error signal ER has crossed zero moving downwards, at which time the binary output signal is set low, and the circuit is switched from the discharging configuration to the charging configuration which provides an output Q for the control of switching of the inductor) (Functional block $I_{AZR}$ and functional block QT;

means for measuring $T_b$, the duration of time when the current error signal is below zero (Functional block $I_{BZT}$);

means for measuring $T_{br}$, the duration of time when the current error signal ER is below zero and ramping upwards (Functional block $I_{PRT}$); and means for determining $T_{ar}$, the duration of time after the current error signal ER has crossed zero moving upwards, at which time the binary output signal is set high, and the circuit is switched from the charging configuration to the discharging configuration (Functional block $I_{BZR}$ and also Functional block QT).

Figure 1A:
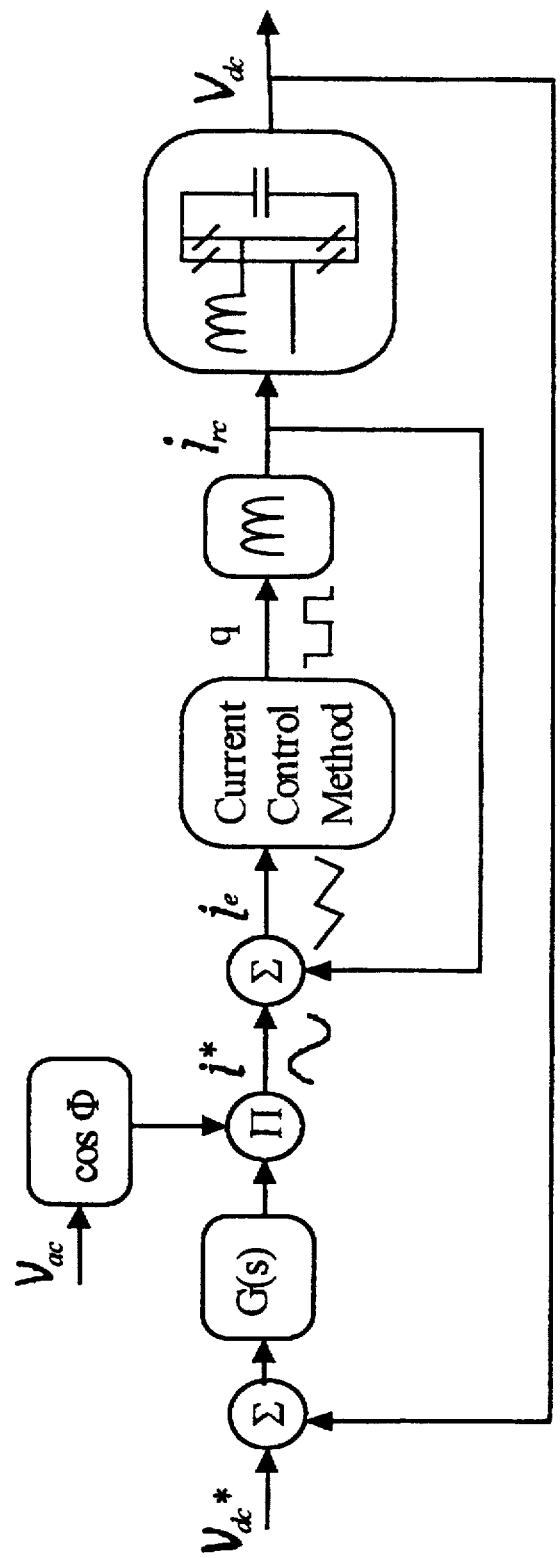
FIG. 1a is a block diagram of a typical control loop using a current control method to regulate the current in an inner loop.
Figure 1B:
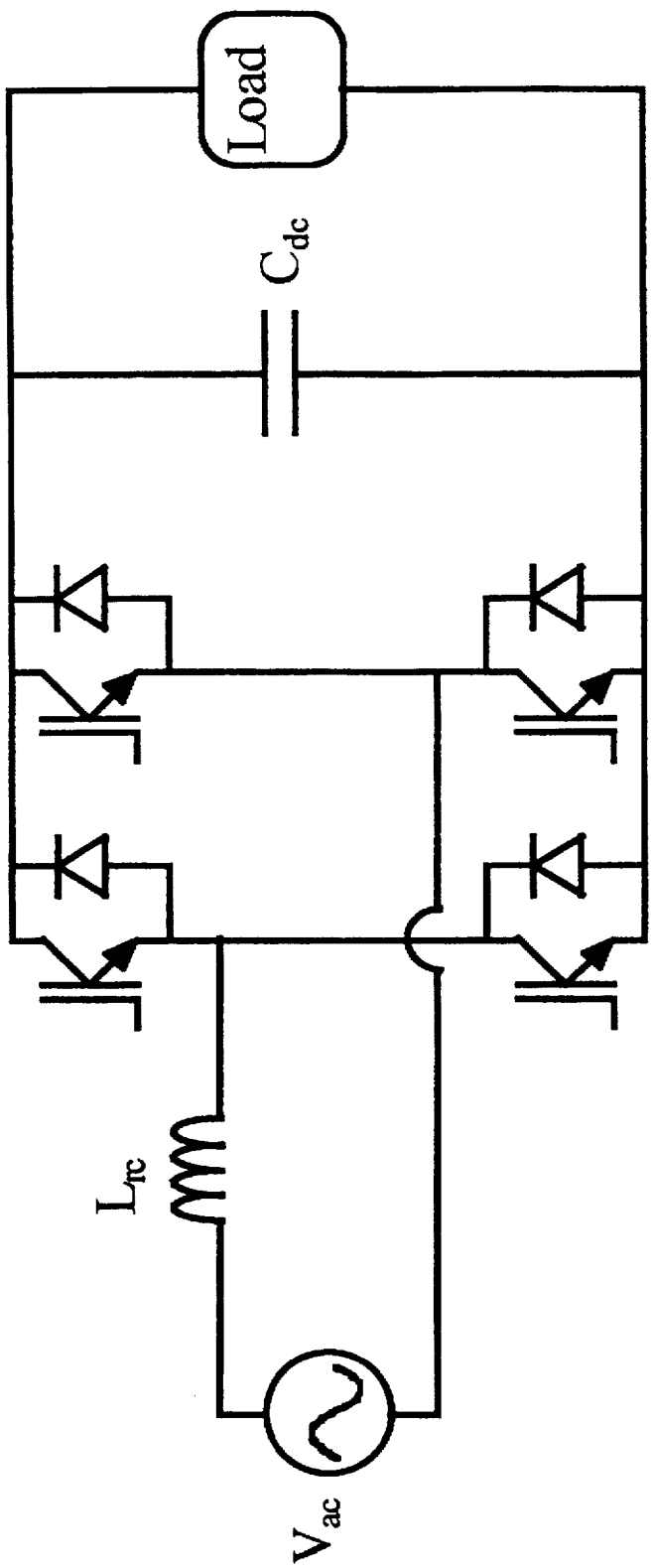
FIG. 1b is a typical example of a single phase ac-dc converter circuit used as a unity power factor rectifier, in which the current control method according to the invention can be utilised.

The power switch drive circuit 7 comprises circuitry to interface the output Q with the gates of the insulated gate bipolar transistors 9, in conventional configuration in an AC-DC power converter of the same type as shown in FIG. 1b.

Referring to FIG. 11 (divided into FIGS. 11a, 11b, and 11c), the circuit diagram of an implementation of the current control circuit shown in FIG. 5, is illustrated. The circuit comprises analog and digital circuitry, although it will be understood that portions of this control circuit could also be implemented using other circuitry including microprocessor based circuitry.

In describing the circuit in FIG. 11 each portion of the circuit is referenced to its respective functional block or signal in FIG. 5, where applicable.

Figure 2:
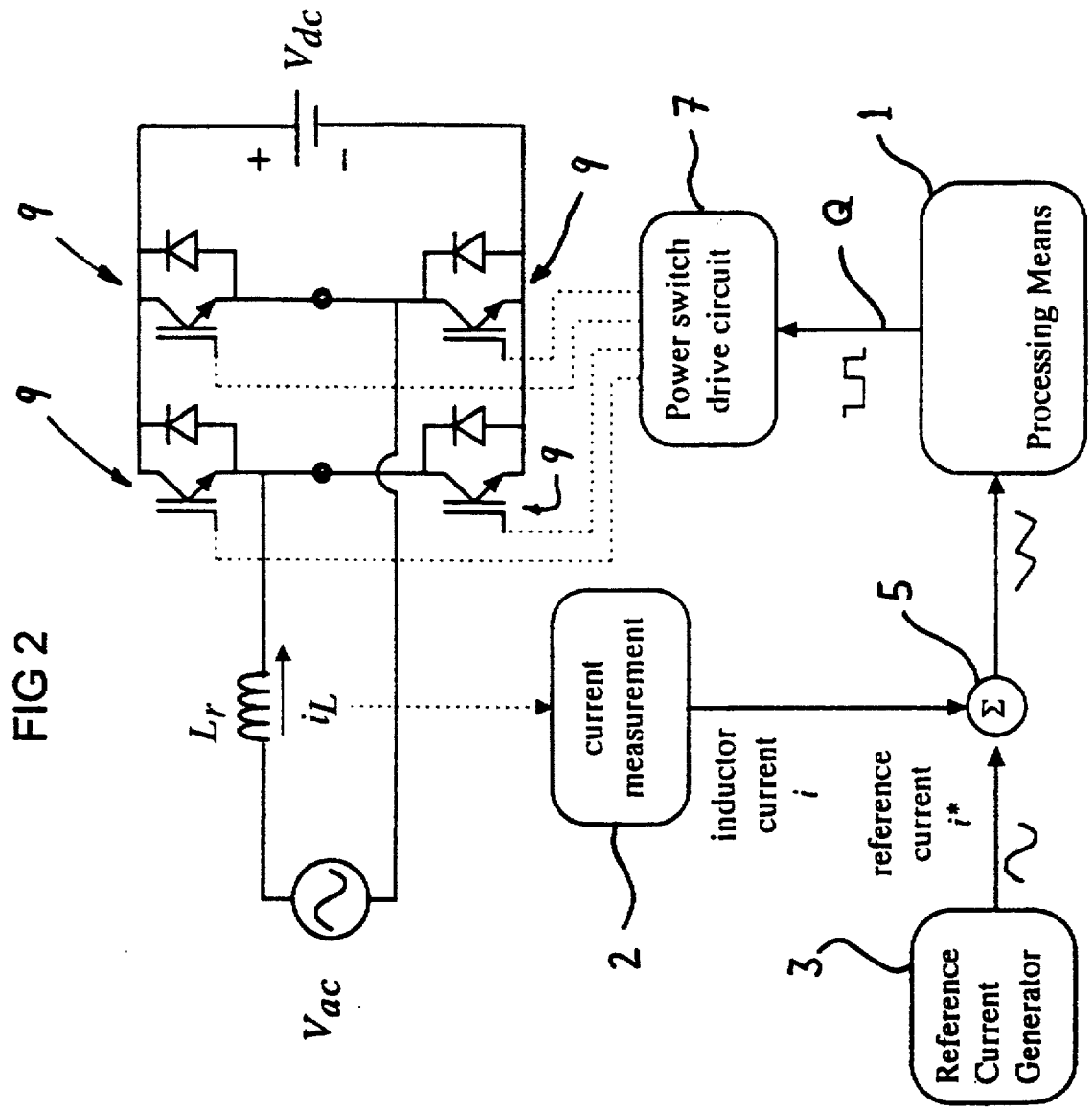
FIG. 2 is a block diagram of a typical control loop using the current control method of the invention to regulate the current in an inner loop.

The current measurement signal i, representing the magnitude and direction of the current in the inductor L, is derived, using the current measurement circuit shown in FIG. 2. The current measurement signal is readily generated from a current measurement transducer having a bandwidth from dc to above the switching frequency, with minimal phase shift. In the embodiment, the current measurement signal is generated using a commercially available hall effect type transducer known as an LEM module (not shown) placed in close proximity to the inductor L. Details of this are not shown in the circuit diagram. It will be understood that other techniques may be employed such as deriving the current measurement signal from the voltage developed across a low value resistor connected in series with the inductor.

The reference current signal i*, representing the magnitude and direction of the desired current or current waveform in the inductor, is fed in from the reference current generator circuit 3. The reference current signal I* can be generated by whatever means is appropriate to achieve the power flow objectives of the converter. In the single phase ac-dc converter of the preferred embodiment, the reference current signal I* was sinusoidal at the fundamental frequency of the ac voltage. It was generated by a clocked output of a digital look-up table, followed by a low pass filter to remove the digital quantization steps. The clock frequency was a multiple of the frequency of a square wave synchronised with the fundamental component of the ac voltage using a phase locked loop.

A current error signal ER, proportional to the difference between the current measurement signal and the reference current signal is generated by the summing circuit 5 which subtracts the current measurement signal I from the reference current signal I*. In three phase systems with a standing phase, the current error signal for the standing phase is subtracted from the current error signal for a controlled phase, giving a current error signal which is a difference current error signal, which can be used in the Ramptime control method. The current error signal is fed to the control circuit where indicated by ER in FIG. 11a.

The following description of the circuit diagram of FIGS. 11a 11b and 11c will be better understood by following the timing waveforms in FIG. 12. In this description, /TR is held high, thereby eliminating its effect and the effect of the H signal (see explanation later in relation to the H signal).

The following table sets out the terminology used in FIGS. 11a, 11b, and 11c, and in the description:

| TERM | DESCRIPTION |
| --- | --- |
| ER | current error signal |
| /ES | (not ES) binary signal indicating the polarity of ER |
| ES | inverted/ES |

-continued

| TERM | DESCRIPTION |
|---|---|
| /ESD | inverted ES |
| /AZT | the output of integrator $I_{AZT}$ |
| BZT | the output of integrator $I_{BZT}$ |
| AZR | the output of integrator $I_{AZR}$ |
| /BZR | the output of integrator $I_{BZR}$ |
| NRT | the output of integrator $I_{NRT}$ |
| /PRT | the output of integrator $I_{PRT}$ |
| /ZA | control signal derived from /Q and /ES and used to zero /AZT |
| Q | output binary signal from from functional block QT |
| /Q | inverted Q |
| QD | inverted /Q |
| ZN | control signal derived from Q (and H when required) to zero NRT |
| /ZP | control signal derived form Q (and H when required) to zero /PRT |
| ZR | output of variable gain opamp to set switching frequency (required to compensate for capacitor tolerances) |
| ZB | control signal derived from /Q and /ES to zero BZT |
| /TR | transient signal input (used to over-ride Ramptime and force hysteretic control if desired) |
| H | hysteretic control output |

Referring to FIG. 11a, the analog current error signal ER is fed into a comparator CA1 to generate binary signals /ES, ES, and /ESD, indicating the polarity of the current error signal. As can be seen in FIG. 11a, both ES and /ESD are derived from /ES by schmidt trigger nand gates L1D and L1C, respectively, both in inverter configuration. ES and /ESD are fed into four integrators, which integrate for specific periods of time to give the output voltages indicated. Integrators A2A and A2B (shown in FIG. 11b) take their input from ES and integrators A1A and A1B (shown in FIG. 11c) take their input from /ESD.

Integrator A2A generates a voltage (/AZT) proportional to $T_a$, the duration of time when the current error signal is above zero within one switching period. The output of integrator A2A begins ramping when the current error signal ER becomes positive, stops ramping when the current error signal ER becomes negative, and is zeroed by /ZA (output of Schmidt nand gate L2D) going low when Q is switched low. Zener diode Z5 imposes a minimum value for /AZT for feeding to the circuitry which follows. Referring to FIG. 11c, Integrator A1B generates a voltage (NRT) proportional to $T_{af}$, the duration of time when the current error signal is above zero and ramping downwards. The output of integrator A1B begins ramping when Q is switched high, stops ramping when the current error signal ER becomes negative, and is zeroed by ZN going high when Q is switched low.

Integrator A2B (FIG. 11b) generates a voltage (BZT) proportional to $T_b$, the duration of time when the current error signal ER is below zero within one switching period. The output of integrator A2B begins ramping when ER the current error signal becomes negative, stops ramping when ER the current error signal becomes positive, and is zeroed by ZB going high when Q is switched high. Zener diode Z6 imposes a minimum value for BZT for feeding to the circuitry which follows.

Integrator A1A (FIG. 11c) generates a voltage IPRT proportional to $T_{br}$, the duration of time when the current error signal ER is below zero and ramping upwards. The output of integrator A1A begins ramping when Q is switched low, stops ramping when the current error signal ER becomes positive, and is zeroed by /ZP going low when Q is switched high.

Integrator A2D (FIG. 11b) generates a voltage ramp (AZR) proportional to the output of integrator A2D of integrator A2A (/AZT) which is proportional to $T_a$. The output begins ramping when ES becomes negative and is zeroed when ES becomes positive.

Integrator A2C generates a voltage ramp (BZR) proportional to the output of integrator A2B (BZT) which is proportional to $T_b$. The output of integrator A2C begins ramping when ES becomes positive and is zeroed when ES becomes negative.

Op-amp A1D provides a variable gain to set the desired value of $T_{sw}$ (the desired switching period) in equation (1) and (2). While this is normally required due to the large possible variance in actual circuit capacitor values, it could be omitted. The following discussion treats op-amp A1D as transparent, equivalent to a gain of 1. Referring to FIG. 11c, the output binary signal Q is generated by comparator CA4 (part of functional block QT). One switching cycle is described here, beginning at a negative going transition of ES. The ramping voltage of integrator A2D (AZR) is compared to the held voltage of integrator A1B (NRT). When the two cross, the desired time period $T_{bf}$ has elapsed, and Q is switched low. This results in the power circuit being switched from the negative voltage configuration to the positive voltage configuration, and ER should now begin ramping upwards. Integrator A1B (NRT) is immediately zeroed and integrator A1A (PRT) begins ramping as described above. When the positive going transition of ES occurs, the output of integrator A1A (PRT) is held, and integrator A2C (BZR) begins ramping. When the two cross, the desired time period $T_{ar}$ has elapsed, and Q is switched high. This results in the power circuit being switched from the positive voltage configuration to the negative voltage configuration, and ER should now begin ramping downwards. The output of integrator A1A (/PRT) is immediately zeroed and the output of integrator A1B (NRT) begins ramping as described above. When the negative going transition of ES occurs, the output of integrator A1B (NRT) is held, and the control circuit has completed one full switching cycle.

The circuitry comprising components D33, D34, D35, D36, R33, R34, R35, and R36 is used solely to set minimum values of PRT and NRT. This ensures that the inputs to comparator CA4 can not both be zero, which would result in an indeterminate Q output. Components C13, D2, C15, D4, C20, D6, C23 and D8 are used only to ensure proper operation of their respective integrator zeroing switches (MOSFETs T1, T2, T3, and T5).

Referring to FIG. 11a, an addition to the basic ramptime circuitry is a hysteretic over-ride control circuit 10 which can be implemented to impose a maximum current error signal excursion. This is useful in multi-phase converters with a standing phase system where the current error signal presented to the controller is suddenly altered at each standing phase transition, which would otherwise lead to transient current excursions of a short duration and low amplitude. This addition is not required for proper operation of the ramptime control, and in fact results in a temporary defeat of the ramptime control. The hysteretic over-ride is only intended to be used for a short time period, roughly equivalent to one switching period in duration. The hysteretic over-ride would not be required for single phase systems, and is not essential in three phase systems.

To effect the hysteretic over-ride, the current error signal is fed into comparator CA2 with a large amount of hysteresis. The output, a binary signal H, has transitions when the error signal passes the hysteresis level. If enabled by the "transient" signal TR, the negative going transition of H will result in the zeroing of PRT and the immediate, positive transition of Q, and the positive going transition of H will result in the zeroing of NRT and the immediate, negative transition of Q. Effectively, Q transitions will occur when the current error hysteresis level is reached.

Figure 6:
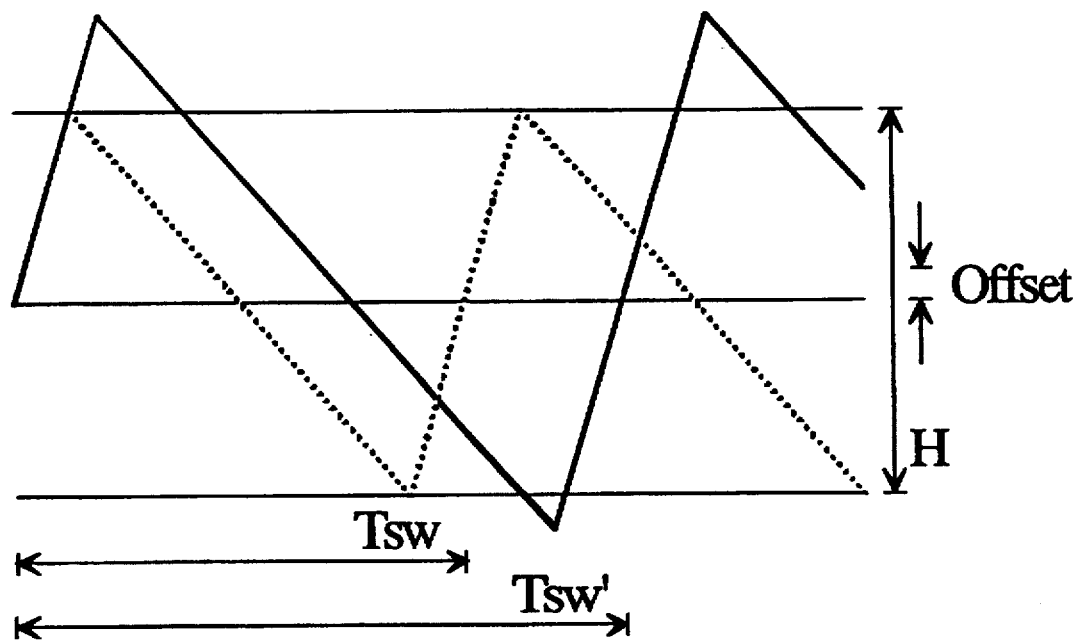
FIG. 6 is a graph showing the effect of a delay in implementing switching decisions in the current control circuit according to the embodiment.

Ramptime current control relies on an immediate implementation of switching decisions to achieve operation with zero average current error and fixed switching frequency. If the current reference is constant, and the implementation of switching decisions is immediate, ramptime current control would produce a fixed switching frequency. Since neither of these is the case in an actual converter, some variance in switching frequency occurs. Delays between the time the switching decision is made (including any pertinent delays in making the decision) and the actual turn on or turn off of the power switches will result in a minimal degradation in ZACE performance. This is illustrated in FIG. 6, where the dotted line is the desired control response, and the solid line is the actual response with a 2 microsecond delay in implementation. It is apparent that the delayed switching results in an extended switching period, and hence a reduction in the actual switching frequency. More importantly, the different current slopes during the upper and lower switching instants result in an small offset of the average current error from zero.

The result of the above mentioned variances is asynchronous switching with a narrow switching frequency spectrum band. Any error in the upper switching instant (perhaps caused by noise) will not affect the ratio of $T_{af}/T_a$ in FIG. 4 and hence the determination of $T_{bf}$ will be unaffected. Once the zero crossing point has been reached, the control will continue operation oblivious to the disturbance, but with an apparently shifted clock. The overall result would be a solitary deviation of the average current error from zero for that switching period, and a deviation of that particular switching period from $T_{nv}$. Hence, ramptime control is stable and robust, being able to resume normal operation in the next half switching period after a disturbance. Under normal operation, each switching instant will be determined accurately, the average current error will be maintained very close to zero for each switching period, and the switching frequency will be contained in a narrow frequency band.

Figure 7:
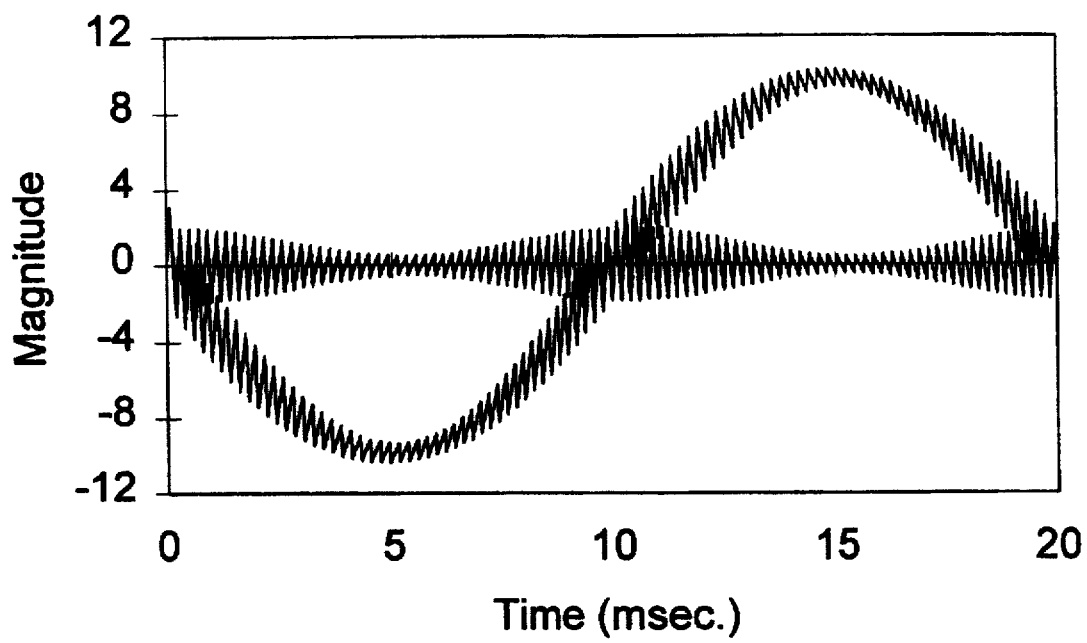
FIG. 7 is a graph showing the simulated converter current, the reference current, and the current error signal.
Figure 8:
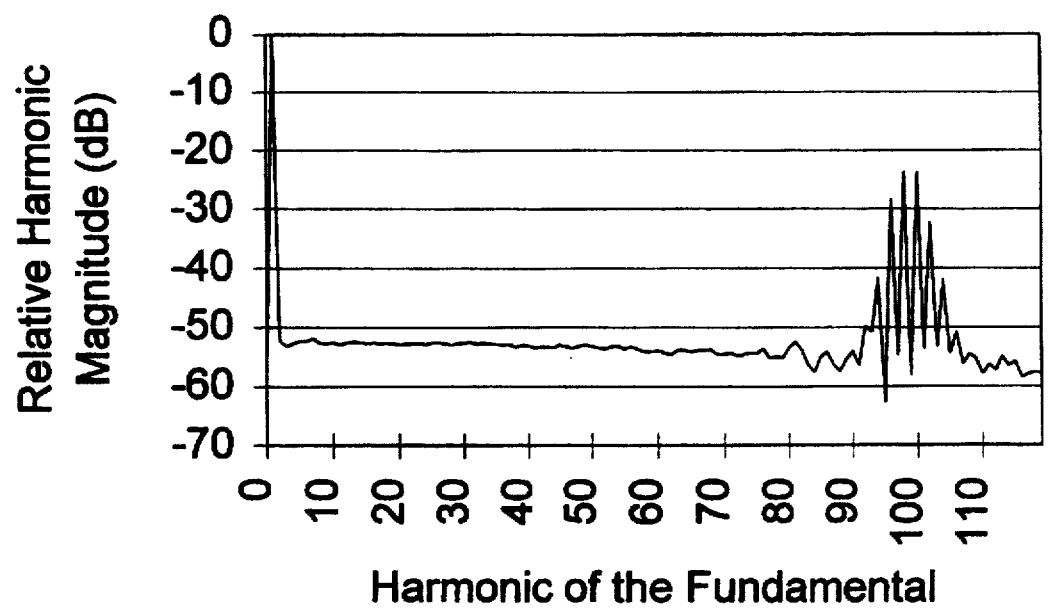
FIG. 8 is a graph showing the harmonic spectrum of the simulated current.

Ramptime current control, as applied to the single phase converter in FIG. 1b, was simulated using the "Alternative Transient Program" (ATP), supplied by K.U. Leuven EMTP Center (LEC), Belgium. With a line voltage of 240 volts, 50 Hz, and a dc link voltage of 400 volts, a reference current of 7.07 amps rms, was commanded. The target switching frequency was 5 kHz. FIG. 7 shows the simulated converter current, the reference current, and the current error signal. It is apparent that the current error is centered around zero, which is indicative of ZACE operation. The transient response is indicated at the start-up, where the current ramps up from zero to the crest value of 10 amps. The current harmonic spectrum up to the 120 harmonic (6 kHz) in FIG. 8 clearly shows no low order current harmonics, and a narrow switching frequency band.

A prototype, full-bridge insulated-gate-bipolar-transistor (IGBT) single phase ac-dc converter, as shown in FIG. 1b, was built to test the ramptime current control method. In the control circuit developed for the prototype, the formulae for determining the switching instants were calculated in a circuit consisting of a mixture of analog and digital electronics, shown in FIG. 11. This was required since the time in which a calculation was required could be as short as a couple of microseconds. Since this current control method relies on measured ramp time durations in the previous half period to determine each switching instant, the initial switching instant may not be determined properly. Hence, on start-up a simple hysteresis control was used for the first 100 microseconds. It should be appreciated that other start-up methods, such as a fixed on-time could be utilised as an alternative.

Figure 9:
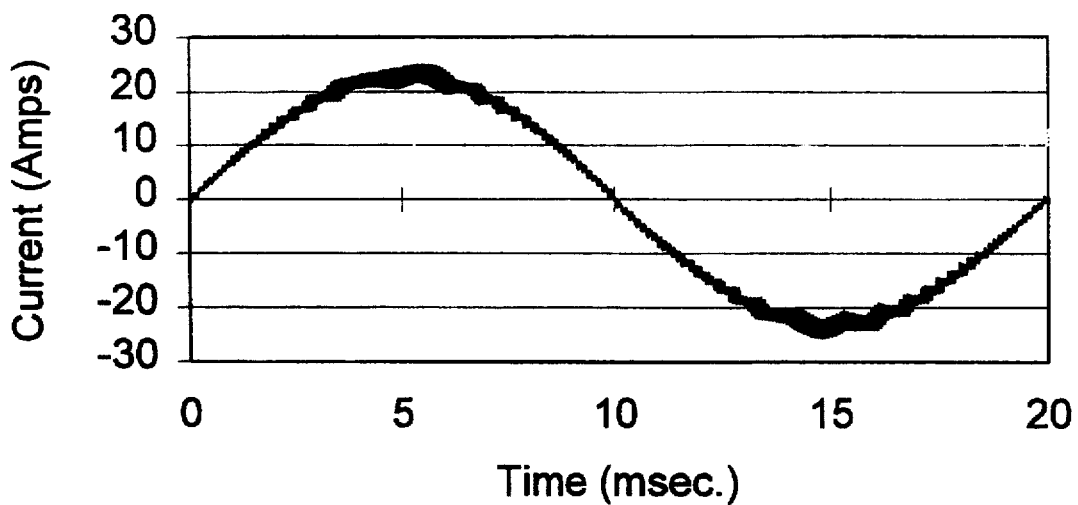
FIG. 9 is a graph showing the experimental current waveform.

The prototype converter operated at 216 $V_{AC}$ and 350 $V_{DC}$, with a 3 kVA capability. The converter output current waveform with a sinusoidal input reference is shown in FIG. 9. The waviness observed in FIG. 9 is not apparent on an oscilloscope. It can be attributed to sampling aliasing, and is not due to current harmonics, as the spectrum in FIG. 10 testifies.

Figure 10:
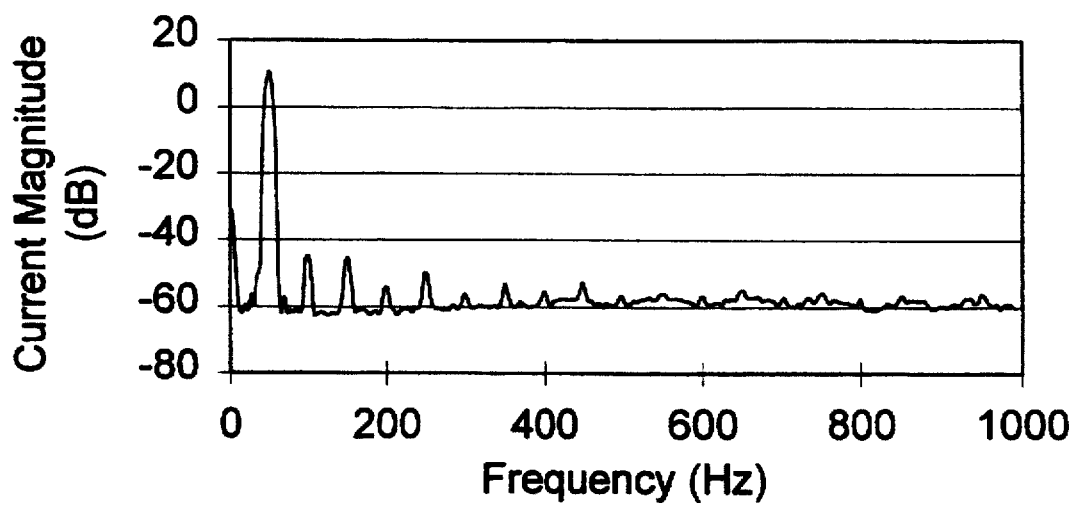
FIG. 10 is a graph showing the average harmonic spectrum of the experimental current.

The converter current harmonic spectrum for low order harmonics (up to 1 kHz) is shown in FIG. 10. It is apparent that the largest harmonics, the third and fifth, are each roughly 55 dB below the fundamental, or roughly 0.2% of the fundamental. This can be attributed to delays in the implementation of switching decisions as discussed earlier, and a non-ideal current reference waveform.

Ramptime current control according to the invention has been shown to follow a sinusoidal reference with high fidelity. It is a "zero average current error" method with a narrow switching frequency. This method provides a higher bandwidth of control with a narrow switching frequency band.

Ramptime current control can be used for accurate control of the current in any switched power converter with an inductor.

Ramptime current control can be applied to any unidirectional or bi-directional ac to ac, ac to dc, or dc to dc single-phase or multi-phase power converter where it is desirable to control the current magnitude or current waveshape. The greatest expected use would be in unity power factor utility interfaces (grid connected applications), in meeting real and reactive power requirements, and in active current harmonic filters.

One application of ramptime current control is the full bridge single phase ac-dc converter shown in FIG. 13. Current reference waveforms which have been used include sinusoids at various phase relationships to the ac voltage. Two binary control output configurations are used. The first, equivalent to a standard diode bridge boost rectifier but with bidirectional capability, has S1 and S2 controlled by Q, with S1 on and S2 off when Q is high. S3 and S4 are switched according to the polarity of $V_{ac}$; S3 is off and S4 is on when $V_{ac}$ is positive. The second configuration utilises the full bridge capability, with S1 and S4 on when Q is high, and S2 and S3 off when Q is high.

Another application of this current control is the full bridge three phase ac-dc converter shown in FIG. 14. One method of controlling the current in this converter is to only switch two of the phases while the third phase is held as a standing phase. At any point in time, the standing phase is chosen as the phase whose voltage is alone in polarity (ie opposite in polarity to both of the other phases), as shown by the darkened portions 11 of the voltage waveforms shown in FIG. 16. The choice of standing phase is not restricted to the phase whose voltage is alone in polarity, although this is the optimum choice for greatest controllability and transient response, and minimization of low order current harmonics. Alternatively, at any given instant in time, either of the two phases which are extremes in value can be chosen as the standing phase, as shown by the darkened portions 13 of the voltage waveforms in FIG. 17. In other words, only the phase whose voltage is between the other two can not be chosen as a standing phase.

The configuration of the switches on the standing phase are set so that the midpoint of the switches is fixed to that same polarity side of the dc link as the polarity of the standing phase. For example, if the instantaneous voltage on phase a is negative while the instantaneous voltages on phase b and c are positive, phase a would be the standing phase, and would be fixed to the negative side of the dc link. In this case, switch S2 would be held on and switch S1 held off. Each standing phase condition would be in effect for periods of roughly 60 degrees of the ac line cycle. The current in each of the inductors, and hence in the converter, is controlled by controlling the difference in current between each of the controlled phases and the standing phase. While a given inductor difference current is being controlled, the binary control output Q for that phase is used to control the status of the two complementary switches connected to that inductor, one switch being off while the other is on. In the above example, the current in $L_b$ minus the current in $L_a$ would be controlled to follow the difference in the respective reference currents using switches S3 and S4. Likewise the difference current between $L_c$ and $L_a$ would be controlled to follow the respective reference current difference using switches S5 and S6. Current reference waveforms which have been used include three phase sinusoids at various phase relationships to the ac voltage.

This current control could also be applied to the single phase boost rectifier shown in FIG. 15. With a sinusoid in phase with $V_{ac}$ used as the current reference waveform, the boost rectifier would operate at a unity power factor. The binary control output would be used to turn S1 on during the charging period, and off during the discharging period.

The control circuit operates to provide a PWM binary output which can be used to control a switch or switches to control the current in an inductor in numerous other power conversion circuits. The important aspect is the method of control as applied to an inductor within the power circuit.

There are numerous other possible applications for this control circuit. While specific examples of applications are given here, they are not intended to limit the application for this control. It should be appreciated that the scope of the invention is not limited to the scope of the embodiment described herein. Application of the ramptime current control method to switching regulator and other applications will be readily apparent to a skilled addressee.

What is claimed is:

1. A control circuit for a switching regulator having at least one inductor, said control circuit comprising:
   a first input for receiving a current measurement signal proportional to the magnitude and direction of current in said at least one inductor, or proportional to the difference in current in two of said at least one inductors;
   a reference current generating means for deriving a reference current signal representing the magnitude and direction of the desired current or current waveform in said inductor, or representing the difference in the desired current or current waveform in two said inductors;
   a processing means for receiving said current measurement signal and said reference current signal, and determining the timing of switching instances; and
   an output to control switching of said at least one inductor between a positive voltage (charging configuration while the current is positive) and a negative voltage state (discharging configuration while the current is positive) in response to said processing means;
   wherein said processing means determines the difference between said current measurement signal and said reference current signal to generate a current error signal representative of the difference or representative of the polarity of the difference;
   and wherein said processing means includes timing calculation means for calculating timing of switching instances to achieve an average current error signal close to zero, based on timing of previous switching instances relative to zero crossing times of the current error signal during a previous excursion.

2. A control circuit as claimed in claim 1 wherein said timing calculation means determines a next switching instant time relative to zero-crossing of said current error signal, based on a previous time of a previous said switching instant relative to zero-crossing of said current error signal.

3. A control circuit as claimed in claim 1 wherein said timing calculation means determines a next switching instant time relative to zero-crossing of said current error signal, based on the time of a previous said switching instant, relative to the time between zero-crossing times of the current signal immediately before and after said previous said switching instant.

4. A control circuit as claimed in claim 3 wherein said timing calculation means determines the next switching instant timing based on previous switching instant timing during a current error signal excursion in a half period ending at the most recent current error signal zero crossing, or in a half period ending 1, 2, or 3 periods before the most recent current error signal zero crossing, and said timing calculation means operates to cause said output to switch a positive voltage across said inductor approximately when $$T_{bf} = \left(\frac{T_{af}}{T_a}\right)\left(\frac{T_{rw}}{2}\right),$$

and operates to cause said output to switch a negative voltage across said inductor approximately when $$T_{ar} = \left(\frac{T_{br}}{T_b}\right)\left(\frac{T_{rw}}{2}\right);$$

where $T_{bf}$ is the calculated time when switching is to occur after the current error signal has crossed zero falling, $T_{af}$ is the measured time the current error signal was above zero after a said switching instant (above zero and falling), $T_a$ is the measured time the current error signal was above zero, $T_{rw}$ is the desired time between successive current error signal zero crossings (the desired switching period), $T_{ar}$ is the calculated time when switching is to occur after the current error signal has crossed zero rising, $T_{br}$ is the measured time the current error signal was below zero after a said switching instant (below zero and rising), and $T_b$ is the measured time the current error signal was below zero.

5. A control circuit as claimed in claim 4 wherein said timing calculation means determines the next switching instant timing based on previous switching instant timing during a current error signal excursion in a half period ending at the most recent current error signal zero crossing, or in a half period ending 1 or 2 periods before the most recent current error signal zero crossing.

6. A control circuit as claimed in claim 4 wherein said timing calculation means determines the next switching instant timing based on previous switching instant timing during a current error signal excursion in a half period ending at the most recent current error signal zero crossing, or in a half period ending one period before the most recent current error signal zero crossing.

7. A control circuit as claimed in claim 4 wherein said timing calculation means determines the next switching instant timing based on previous switching instant timing during a current error signal excursion in a half period ending at the most recent current error signal zero crossing.

8. A control circuit as claimed in claim 3 wherein said timing calculation means determines the next switching instant timing being based on previous switching instant timing during a current error signal excursion in a half period ending one, three, five, or seven zero crossings before the most recent current error signal zero crossing, and said timing calculation means operates to cause said output to switch a negative voltage across said inductor approximately when $$T_{ar} = \left(\frac{T_{arp}}{T_a}\right)\left(\frac{T_{rw}}{2}\right),$$

and operates to cause said output to switch a positive voltage across said inductor approximately when $$T_{bf} = \left(\frac{T_{bfp}}{T_b}\right)\left(\frac{T_{rw}}{2}\right);$$

where:

$T_{ar}$ is the calculated time when switching is to occur after the current error signal has crossed zero rising, $T_{arp}$ is the measured time the current error signal was above zero before a said previous switching instant (above zero and rising), $T_a$ is the measured time the current error signal was above zero in a previous excursion, $T_{rw}$ is the desired time between successive current error signal zero crossings (the desired switching period), $T_{bf}$ is the calculated time when switching is to occur after the current error signal has crossed zero falling, $T_{bfp}$ is the measured time the current error signal was below zero before a said previous switching instant (below zero and falling), and $T_b$ is the measured time the current error signal was below zero in a previous excursion.

9. A control circuit as claimed in claim 8 wherein said timing calculation means determines the next switching instant timing being based on previous switching instant timing during a current error signal excursion in a half period ending one, three, or five zero crossings before the most recent current error signal zero crossing.

10. A control circuit as claimed in claim 8 wherein said timing calculation means determines the next switching instant timing being based on previous switching instant timing during a current error signal excursion in a half period ending one or three zero crossings before the most recent current error signal zero crossing.

11. A control circuit as claimed in claim 8 wherein said timing calculation means determines the next switching instant timing being based on previous switching instant timing during a current error signal excursion in a half period ending one zero crossing before the most recent current error signal zero crossing.

12. A control circuit as claimed in claim 1 wherein said first input is connected to a first circuit for deriving said current measurement signal proportional to the magnitude and direction of the current in the inductor.

13. A control circuit as claimed in claim 1 wherein said output provides a binary signal which is to be used to control the switching of an active controlling device.

14. A control circuit as claimed in claim 13 wherein said active controlling device comprises a semiconductor switch or switches.

15. A method of controlling a switching regulator having at least one inductor, comprising:

deriving a current measurement signal proportional to the magnitude and direction of current in said at least one inductor, or proportional to the difference in current in two of said at least one inductors;

deriving a reference current signal representing the magnitude and direction of the desired current or current waveform in said inductor, or representing the difference in the desired current or current waveform in two said inductors;

determining the difference between said current measurement signal and said reference current signal to generate a current error signal representative of the difference; and calculating the timing of switching instances to control switching of said inductor to achieve an average current error signal close to zero, based on timing of previous switching instances relative to zero crossing of the current error signal during a previous excursion.

16. A method as claimed in claim 15 where in the step of calculating said switching instances, a new time from zero-crossing of said current error signal to a said switching instant is calculated, based on a previous time of a previous said switching instant relative to zero-crossing of said current error signal.

17. A method as claimed in claim 15 where in the step of calculating said switching instances, a new time from zero-crossing of said current error signal to a said switching instant is calculated, based on a previous time of a previous said switching instant relative to the time between zero-crossing times of the current error signal immediately before and after said previous said switching instant.

18. A method as claimed in claim 17 where when a new switching instant is being determined based on previous switching instant timing during a current error signal excursion in a half period ending at the most recent current error signal zero crossing, or in a half period ending 1, 2, or 3 periods before the most recent current error signal zero crossing, in the step of calculating said switching instances, a positive voltage is switched to said inductor approximately when $$T_{bf} = \left(\frac{T_{af}}{T_a}\right)\left(\frac{T_{rw}}{2}\right),$$

and a negative voltage is switched to said inductor approximately when $$T_{ar} = \left(\frac{T_{br}}{T_b}\right)\left(\frac{T_{rw}}{2}\right);$$

where:

$T_{bf}$ is the calculated time when switching is to occur after the current error signal has crossed zero falling, $T_{af}$ is the measured time the current error signal was above zero after a said switching instant (above zero and falling), $T_a$ is the measured time the current error signal was above zero, $T_{rw}$ is the desired time between successive current error signal zero crossings (the desired switching period), $T_{ar}$ is the calculated time when switching is to occur after the current error signal has crossed zero rising, $T_{br}$ is the measured time the current error signal was below zero after a said switching instant (below zero and rising), and $T_b$ is the measured time the current error signal was below zero.

19. A method as claimed in claim 18 where when a new switching instant is being determined based on previous switching instant timing during a current error signal excursion in a half period ending at the most recent current error signal zero crossing, or in a half period ending 1 or 2 periods before the most recent current error signal zero crossing.

20. A method as claimed in claim 18 where when a new switching instant is being determined based on previous switching instant timing during a current error signal excursion in a half period ending at the most recent current error signal zero crossing, or in a half period ending 1 period before the most recent current error signal zero crossing.

21. A method as claimed in claim 18 where when a new switching instant is being determined based on previous switching instant timing during a current error signal excursion in a half period ending at the most recent current error signal zero crossing.

22. A method as claimed in claim 17 where when the next switching instant timing is being based on previous switching instant timing during a current error signal excursion in a half period ending one, three, five, or seven zero crossings before the most recent current error signal zero crossing, in the step of calculating said switching instances, a negative voltage is switched across said inductor approximately when $$T_{ar} = \left(\frac{T_{arp}}{T_a}\right)\left(\frac{T_{sw}}{2}\right),$$

and a positive voltage is switched across said inductor approximately when $$T_{bf} = \left(\frac{T_{bfp}}{T_b}\right)\left(\frac{T_{sw}}{2}\right);$$

where:

$T_{ar}$ is the calculated time when switching is to occur after the current error signal has crossed zero rising, $T_{arp}$ is the measured time the current error signal was above zero before a said previous switching instant (above zero and rising), $T_a$ is the measured time the current error signal was above zero in a previous excursion, $T_{sw}$ is the desired time between successive current error signal zero crossings (the desired switching period), $T_{bf}$ is the calculated time when switching is to occur after the current error signal has crossed zero falling, $T_{bfp}$ is the measured time the current error signal was below zero before a said previous switching instant (below zero and falling), and $T_b$ is the measured time the current error signal was below zero in a previous excursion.

23. A method as claimed in claim 22 where when the next switching instant timing is being based on previous switching instant timing during a current error signal excursion in a half period ending one, three, or five zero crossings before the most recent current error signal zero crossing.

24. A method as claimed in claim 22 where when the next switching instant timing is being based on previous switching instant timing during a current error signal excursion in a half period ending one, or three zero crossings before the most recent current error signal zero crossing.

25. A method as claimed in claim 22 where when the next switching instant timing is being based on previous switching instant timing during a current error signal excursion in a half period ending one zero crossing before the most recent current error signal zero crossing.

26. A control circuit as claimed in claim 1, wherein the control circuit is used in a switching power supply to control the switching power supply.

* * * * *

UNITED STATES PATENT AND TRADEMARK OFFICE
CERTIFICATE OF CORRECTION

PATENT NO. : 5,801,517
DATED : September 1, 1998
INVENTOR(S) : Lawrence Joseph Borle Page 1 of 2

It is certified that error appears in the above-identified patent and that said Letters Patent is hereby corrected as shown below:

In column 6, line 36, please delete "," after "signal" and insert -- has crossed zero rising,-- therefor.

In column 7, line 22 please insert -- Brief Description of the Drawings -- therefor.

In column 7, line 65, please insert --Detailed Description of the Invention-- therefor.

In column 8, line 57, please insert --block diagram form in-- before "Fig. 5" therefor.

In column 9, line 5, please insert --ER-- after "error signal" therefor.

In column 9, line 19, please delete "L, in the form of a current measuring circuit 2" and insert --Referring to figure 2, an entire switching regulator incorporating the-- therefor.

In column 9, line 19, please insert --1-- after "circuit" therefor.

In column 9, line 23, please delete ";" and insert --L, in the form of a current measuring circuit 2-- therefor.

UNITED STATES PATENT AND TRADEMARK OFFICE
CERTIFICATE OF CORRECTION

PATENT NO. : 5,801,517
DATED : September 1, 1998
INVENTOR(S) : Lawrence Joseph Borle It is certified that error appears in the above-identified patent and that said Letters Patent is hereby corrected as shown below:

In column 9, line 53, please insert --ER-- after "signal" therefor.

In column 11, line 13, please delete "from" after "signal" therefor.

In column 11, line 50, please delete "ER" and insert --ER-- after "signal" therefor.

In column 11, line 52, please delete "ER" and insert --ER-- after "signal" therefor.

In column 11, line 56, please delete "IPRT" and insert --/PRT-- therefor.

In column 11, line 66, please insert --of integrator A2C-- after "output" therefor.

Signed and Sealed this

Twenty-eighth Day of November, 2000

*Attest:*

*Attesting Officer*

Q. TODD DICKINSON

*Director of Patents and Trademarks*